Feb. 2, 1971 W. W. WATSON 3,560,021
MUDGUARDS
Filed Aug. 19, 1969 2 Sheets-Sheet 1
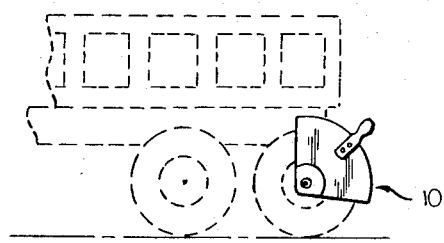
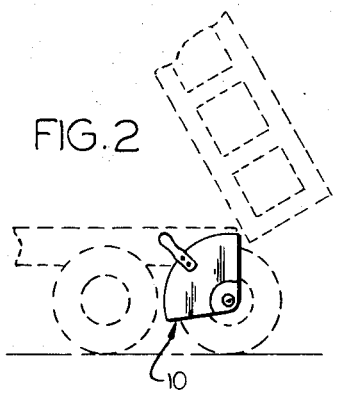
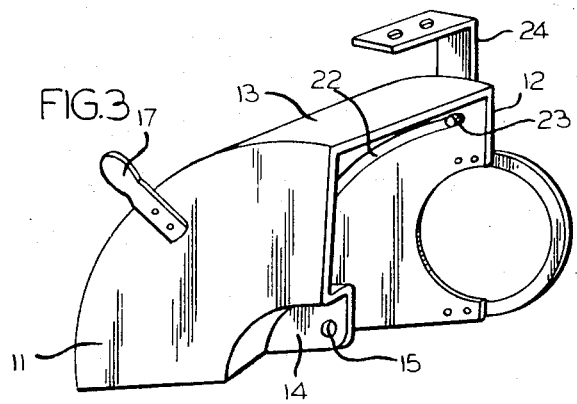
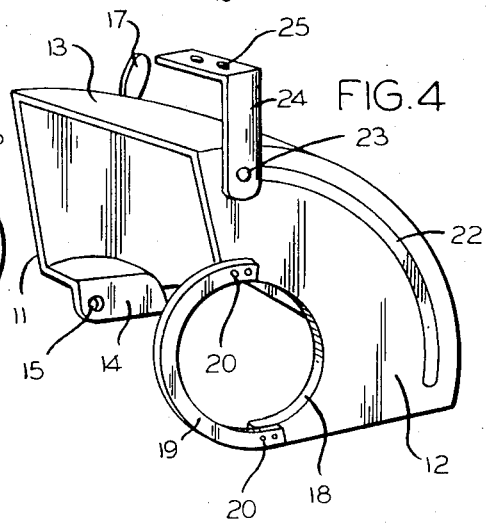
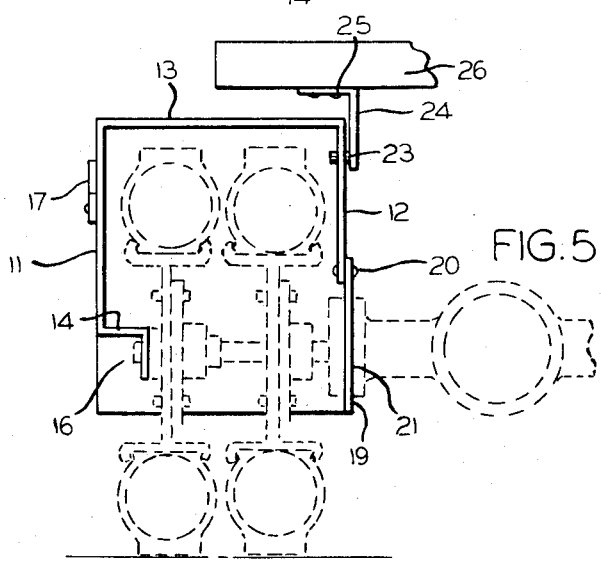
INVENTOR
WILLIAM W. WATSON
BY *Alter and Weiss*
ATTORNEYS Feb. 2, 1971  W. W. WATSON  3,560,021
MUDGUARDS
Filed Aug. 19, 1969  2 Sheets-Sheet 2

INVENTOR
WILLIAM W. WATSON

BY
*Alter and Weiss*
ATTORNEYS

3,560,021
MUDGUARDS
William W. Watson, 4912 W. Jerelyn Place,
Milwaukee, Wis. 53219
Continuation-in-part of application Ser. No. 786,999,
Dec. 26, 1968. This application Aug. 19, 1969, Ser.
No. 851,415
Int. Cl. B62d 25/16
U.S. Cl. 280—154.5                              11 Claims

ABSTRACT OF THE DISCLOSURE

A mudguard for the rear wheels of dump trucks. The mudguard is pivotally mounted to enable moving it when the truck is being unloaded.

---

This is a continuation-in-part of my application entitled "Improvement in Mudguards," which I filed on Dec. 26, 1968 and which has been assigned Ser. No. 786,-999 and now abandoned.

My invention relates to mudguards, and more particularly to mudguards for the rear wheels of dump trucks or the like. The prime object of my invention is to provide a rotatable mudguard that is movably mounted in a pivotal manner to rotate about the axis of the wheel on which it acts as a mudguard.

Another object of my invention is to provide a device of the character described that may be manually operated or remotely operated from the cab of the vehicle to which it is attached.

Still another object of the invention is to provide a mudguard that is guided in its pivoted path and restricted in its adjustment.

It is manifest to anyone familiar with the art that it is imperative to equip vehicles such as dump trucks, cement trucks, cargo and over-the-road trucks with "flap-guards," or the like to prevent the automotive vehicle from throwing stones or gravel from the road onto any approaching or following vehicles, thereby creating a hazard, such as broken windshields, or the like. Then too, it is quite frequently the fact that the "flap-guards" become imbedded in the material being conveyed when the material is dumped from the truck, and thus, be torn from its mounting when the truck is moved forward.

The revolvable mudguards illustrated, described, and claimed herein provide a positive means of preventing the truck tires from throwing particles disposed on the road toward the approaching or following vehicles and may be revolved about the wheel axis manually or remotely into an out-of-the-way position when the material disposed in the truck body is deposited onto the ground surface or pavement.

The guards constituting my inventiton are simple in construction, and may be designed in a manner to permit ease of application and be operated without special mechanical skill.

Other and further objects of my invention will become more apparent as the description proceeds, when taken in conjunction with the drawings, in which:

FIG. 1 is a fragmentary view of a conventional dump truck shown in phantom with a first embodiment of the mudguard constituting my invention disposed rearwardly while in a driving position;

FIG. 2 is a similar view with the first embodiment of the mudguard disposed in a forward position while the truck body is in an unloading position;

FIG. 3 is a perspective view of the first embodiment of the guard showing its outer shape and contour;

FIG. 4 is a perspective view of the first embodiment of the guard showing its inner shape and arrangement;

FIG. 5 is a rear partially sectional view of the truck axle, frame and wheels of conventional design shown in phantom and illustrating a method of supporting the first embodiment of the mudguard.

Figure 6:
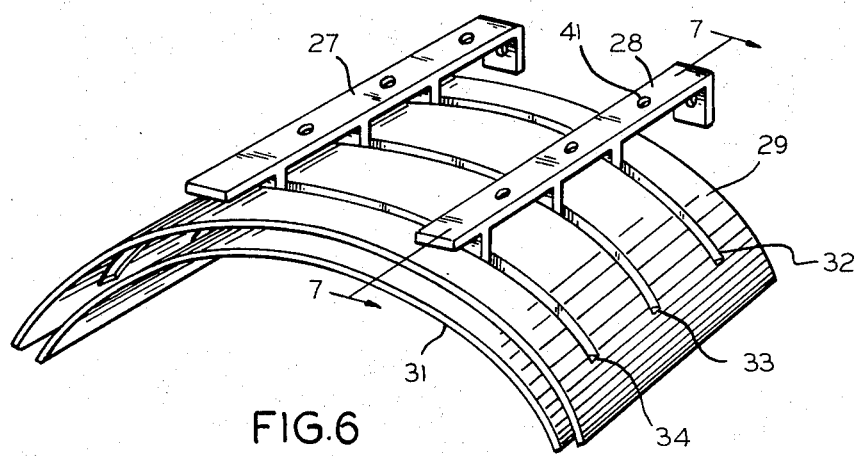
FIG. 6 is a pictorial view of a second embodiment of the inventive mudguard.

Similar characters of reference indicate corresponding parts and features throughout the several views, and referring now to the same the character 10 shows generally the body of the guard, which may be constructed of metal, plastic, Fiberglas, or the like. The first embodiment of the inventive mudguard comprises an outer plate 11, an inner plate 12 and a radially formed portion 13 integral with the plates 11 and 12. Obviously, the parts 11, 12, and 13 constituting the guard body may be made any size and width to fit the wheels of the vehicle to which it is applied.

The outer plate 11 (see FIG. 3), is equipped with a recessed portion 14 which has an aperture 15 therein to accommodate an attaching means shown as 16 (see FIG. 5). A handle or lever 17 is shown attached to the plate 11 in any efficient or convenient manner for the manual manipulation of the guard in a forward or rearward position, as shown in FIGS. 1 and 2.

The lever 17 may be replaced by linkage or a gear arrangement (not shown), if the guards are to be remotely controlled by electric, pneumatic, or hydraulic means.

By referring to FIG. 4, it will be noted that I show the inner plate 12 cut out at 18 in a radial manner, and a radially formed member 19 is attached at 20 to the plate 12 for encircling the brake drum 21 forming a part of the rear axle assembly shown in phantom in FIG. 5.

I also show a radial slot 22 in the plate 12, and a guide pin 23 supported by a member bracket 24, which member is attached at 25 to the vehicle frame 26 (see FIG. 5). The purpose of the guide pin 23 engaging the slot 22 is to limit the radial movement of the guard 10 in a forward and rearward position.

The bracket member 24 may be constructed in any practical manner to fit the truck frame 26. The radial support formed by the cutout 18, and the member 19 may vary to fit the particular portion of the axle assembly forming a part of the truck. The prime purpose of the device is to provide a mudguard that may be pivotally adjusted to revolve about the axis of the wheel which it serves.

The mudguard of the first embodiment already described revolves about an axis that is coaxial with the axle of the rear wheel on which the mudguard is positioned. One of the pivot points in the first embodiment is part of the axle itself. The other pivot point is the pin 23 attached to bracket 24, which sits in groove 22 of plate 11.

The second embodiment of the mudguard has pivot points which are removed from direct association with the axle of the wheels on which the mudguards are mounted. Instead the pivot points are dependent from the brackets used to mount the mudguards.

Means are provided for affixing the mudguards to the frame of the truck or vehicle on which the mudguards are being mounted. The means shown in FIGS. 6, etc. are the brackets 27 and 28.

Figure 7:
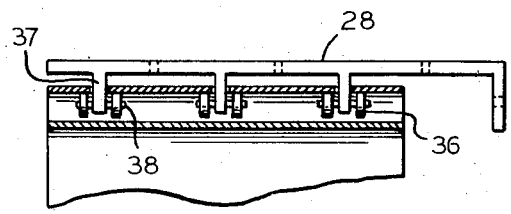
FIG. 7 is a sectional view of the embodiment of FIG. 6 in a plane passing through line 7—7 and looking in the direction of the arrows.
Figure 8:
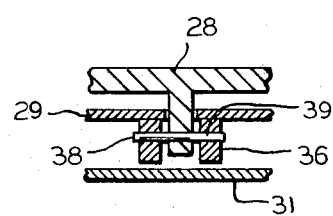
FIG. 8 is a view of a detail of FIG. 7.

The mudguards themselves comprise bearing plate or top plate 29 and a mudguard plate or bottom plate 31. The bearing plate shown in FIGS. 6, 7 and 8 has a plurality of longitudinal grooves therein, such as grooves 32, 33 and 34. Actually any reasonable number of grooves can be used, but the embodiment shown herein uses three grooves.

Bearing means are provided on which the mudguard pivots in revolving about the axis that is coaxial with the axle of the wheels being served by the mudguards. More particularly bearing wheels 36 are shown coupled to brackets 28 by downwardly extending standards 37. Bearing wheel axles, such as bearing wheel axle 38, is journaled through an aperture 39 in downwardly extending standard 37. The bearing wheels bear against bearing plate 29 and make it more feasible to move the mudguard from its mudguarding position at the rear of the wheel to its out-of-the-way position at the front of the wheel. Both positions are shown in FIGS. 11 and 12 respectively.

Means such as bolts may be used in cooperation with the apertures 41 in bracket 27 for attaching the brackets to the frame of the dump truck or vehicle utilizing the mudguards.

Figure 9:
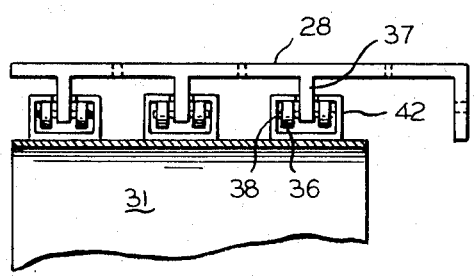
FIG. 9 is a sectional view of a variation in the pivot arrangement of FIG. 7.
Figure 10:
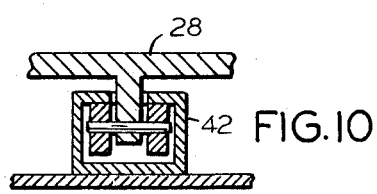
FIG. 10 is a view of a detail of FIG. 9.

Means (not shown) are provided for permanently affixing the bearing plate and the guard plate together. This means may be bolts and nuts or bolts which may extend into threaded holes on either of the two plates. FIGS. 9 and 10 show an alternate arrangement wherein instead of a bearing plate a plurality of bearing tracks are provided such as bearing track 42. Here again bearing wheels are attached to the downwardly extending standards 37, which are integral to bracket 28. The bearing wheel arrangement is the same as that of the embodiment of FIGS. 7 and 8. This is readily seen since the numerical designations are the same.

Figure 11:
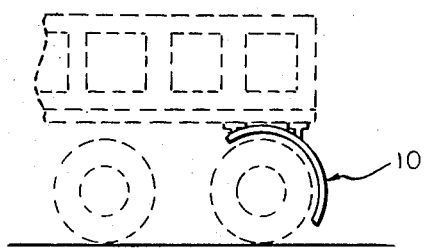
FIG. 11 is a fragmentary view of a conventional dump truck shown in phantom with the second embodiment of the mudguard disposed rearwardly while in a driving position.
Figure 12:
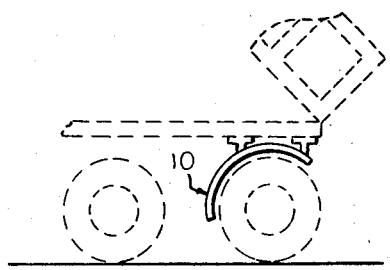
FIG. 12 is a similar view with the second embodiment of the mudguard in a forward position while the trucks body is in an unloading position.

In operation, the mudguard is normally in the position shown in FIG. 11. When it is desired to dump the load from the dump truck, then the mudguard is pivoted on its bearing wheels and moved to the position shown in FIG. 12. Handle means may be attached to the mudguard, such as the lever handle 17 shown on the first embodiment; or the mudguard may be moved automatically either electrically, hydraulically, or pneumatically by means not shown but well known to those skilled in the art.

Among the advantages of the embodiment shown in FIGS. 6 thru 12 are the bearing arrangement making the mudguard easier to remove.

Having thus described my invention, what I claim and desire to secure by Letters Patent in the United States is:

1. A mudguard for use on the rear dual wheels of dump trucks, or the like, said mudguard comprising:
guard means extending over at least the tread width of the dual wheels for preventing the rear wheels of the trucks from throwing debris,
means at a plurality of support points for pivotally mounting said guard means over said dual wheels to enable rotation of said guard means about the axis of said rear wheels for movement of said guard means from a normal position at the rear of said rear wheels to a retracted position removed from the rear of said rear wheels, and
means for moving said guard means between said positions.

2. The mudguard of claim 1 wherein said guard means comprises an inner plate spaced apart from the inner side of said rear wheels,
an outer plate spaced apart from the outer side of said rear wheels and a radially formed portion joining said plates and partially surrounding said wheels, 3. The mudguard of claim 2 wherein said mounting means comprises means for pivotally mouning said guard means.

4. The mudguard of claim 3 wherein said means for pivotally mounting said guard means comprises a recessed portion on said outer plate contiguous to the axle of said wheels,
means including an aperture in said recessed portion for coupling said front plate to said axl^
an arcuate section on said inner plate,
an arcuate member cooperating with said arcuate section to completely surround the rear axles of the trucks and means attaching said guard means to the frames of said trucks.

5. The mudguard of claim 4 wherein said frame attaching means comprises means for limiting the movement of said guard means between said positions.

6. The mudguard of claim 4 wherein said frame attaching means comprises bracket means attached to the frame and extending downward therefrom,
slot means in said inner plate, and
pin means coupling said bracket means to said slot means.

7. The mudguard of claim 4 including handle means mounted on said outer plate for moving said guard means between positions.

8. The mudguard of claim 1 wherein said guard means comprises a guard plate,
said guard plate being arcuately formed to fit about said rear wheel,
bracket means equipped for attachment to the frame of said trucks having the rear wheels, bearing track means attached to said guard plate,
downwardly extending standards extending from said bracket to said track means,
and bearing means pivotally attached to said standards and located contiguously to said track means whereby said guard means is moved on said bearing means between said positions.

9. A mudguard for use on the rear wheels of dump trucks, or the like, said mudguard comprising:
guard means for preventing the rear wheels of the trucks from throwing debris, said guard means further comprising a bottom guard plate and a top plate spaced apart from said bottom guard plate,
said bottom and top plates being arcuately formed to fit about said rear wheels,
means for mounting said guard means to enable rotation of said guard means about the axis of said rear wheels for movement of said guard means from a normal position at the rear of said rear wheels to a retracted position removed from the rear of said rear wheels,
said mounting means comprising bearing means between said bottom and top plates to facilitate the movement of said guard means as it rotates about said axis, and
means for moving said guard means between said positions.

10. The mudguard of claim 9 including frame attaching means, said frame attaching means comprising bracket means equipped for attaching to the frame of the truck bearing the rear wheels, standards downwardly depending from said bracket means, and means for pivotally attaching said bearing means to said standards.

11. The mudguard of claim 10 wherein said top plate comprises slots therein for receiving said standards therethrough, and wherein said bearing means comprises bearing wheels that bear against the bottom of said top plate at the sides of said slots.

References Cited
UNITED STATES PATENTS

| | | | |
|---|---|---|---|
| 657,972 | 9/1900 | Ward | 280—57 |
| 2,414,676 | 1/1947 | Taurman et al. | 280—154.5 |
| 2,721,760 | 10/1955 | Lapham et al. | 280—153 |

LEO FRIAGLIA, Primary Examiner

R. R. SONG, Assistant Examiner

U.S. Cl. X.R.

298—1